(12) United States Patent
Hatfield et al.

(10) Patent No.: US 11,199,290 B2
(45) Date of Patent: Dec. 14, 2021

(54) ADJUSTABLE COMPUTER STAND

(71) Applicant: HUMANCENTRIC VENTURES LLC, Skokie, IL (US)

(72) Inventors: Justin Hatfield, Skokie, IL (US); James Orrico, Evanston, IL (US)

(73) Assignee: Humancentric Ventures, LLC, Skokie, IL (US)

( * ) Notice: Subject to any disclaimer, the term of this patent is extended or adjusted under 35 U.S.C. 154(b) by 77 days.

(21) Appl. No.: 16/807,491

(22) Filed: Mar. 3, 2020

(65) Prior Publication Data

US 2020/0278075 A1 Sep. 3, 2020

Related U.S. Application Data

(60) Provisional application No. 62/813,061, filed on Mar. 3, 2019.

(51) Int. Cl.
*F16M 11/00* (2006.01)
*F16M 11/20* (2006.01)

(52) U.S. Cl.
CPC ............... *F16M 11/2021* (2013.01)

(58) Field of Classification Search
CPC .... F16M 11/2021; F16M 11/20; F16M 11/38; F16M 11/06; F16M 13/00; F16M 11/105; F16M 11/041
See application file for complete search history.

(56) References Cited

U.S. PATENT DOCUMENTS

| | | | |
|---|---|---|---|
| 6,549,949 B1 * | 4/2003 | Bowman-Amuah | ... H04L 69/08 709/236 |
| D622,274 S * | 8/2010 | Green | ............ D14/447 |
| 7,861,995 B2 * | 1/2011 | Liou | ..... F16M 11/105 248/454 |
| 2010/0213331 A1 * | 8/2010 | Liou | .......... F16M 11/2021 248/176.3 |
| 2017/0223161 A1 * | 8/2017 | Lau | ..... F16M 11/2021 |

* cited by examiner

*Primary Examiner* — Amy J. Sterling

(57) ABSTRACT

The invention provides an automatically adjustable computer stand for thin as well as thick computers, e.g., laptops and tablets. The stand has a first support arm and a second support arm, each arm being connected to the other arm by at least one living hinge, said living hinge exhibiting a relatively flexible central portion whereby weight from a computer pressing on the central portions of each living hinge causes each support arm to rotate inwardly towards the other support arm and into contact with said computer.

10 Claims, 7 Drawing Sheets

ADJUSTABLE COMPUTER STAND

FIELD OF THE INVENTION

The present invention relates to a stand for a laptop computer that automatically adjusts to the width of any laptop.

BACKGROUND OF THE INVENTION

Laptop stands are often configured to support the computer at an upward angle that allows the keyboard and display to be accessible to the user. Such an arrangement may not be desirable for all users and computer devices. For example, the display of a keyboard on a tablet may be at an uncomfortable angle even though the display is convenient to view.

Users of laptop and tablet computers may prefer to connect their laptop to one or more monitors, printers, and peripherals at a home or work location. Such connections have typically been made while the laptop lays flat on the station desktop. Such a location and orientation may not, however, work well for all desktops or locations.

Vertical stands are commercially available that are monolithic stands having fixed, upstanding arms that form channels of a fixed width. Those with an adjustable width use set screws or knobs on one or more laterally sliding fins to adjust the channel distance between the supporting arms. One other unit uses a biased support arm and a fixed arm, but with a minimum width between the arms when the biased arm is at rest without pressure. None of the current vertical stands are automatically adjustable without a minimum channel distance.

It would be desirable to have a stand that would hold a laptop securely in an upright orientation without regard to the weight or thickness of the laptop.

It would also be desirable to provide a stand that would automatically adjust to any thickness of computer and grip the computer in the stand.

SUMMARY OF THE INVENTION

As described and shown herein, the inventors have developed a computer stand that will grip and secure an inserted computer device in a vertical orientation regardless of thickness.

Accordingly, the invention provides an automatically adjustable computer stand having a first support arm and a second support arm, each arm being connected to the other arm by at least one living hinge, said living hinge exhibiting a flexible central portion whereby weight from a computer pressing on the central portions of each living hinge causes each hinge to flex and cause each connected support arm to rotate inwardly towards the other support arm and into contact with said computer.

The automatic flexure of the living hinge responds to any thickness of computer when inserted vertically between the support arms. Thin as well as relatively thick computers can thereby find both vertical support and a stable platform for connecting peripherals and accessories around the perimeter of the inserted computer.

DETAILED DESCRIPTION

Figure 1:
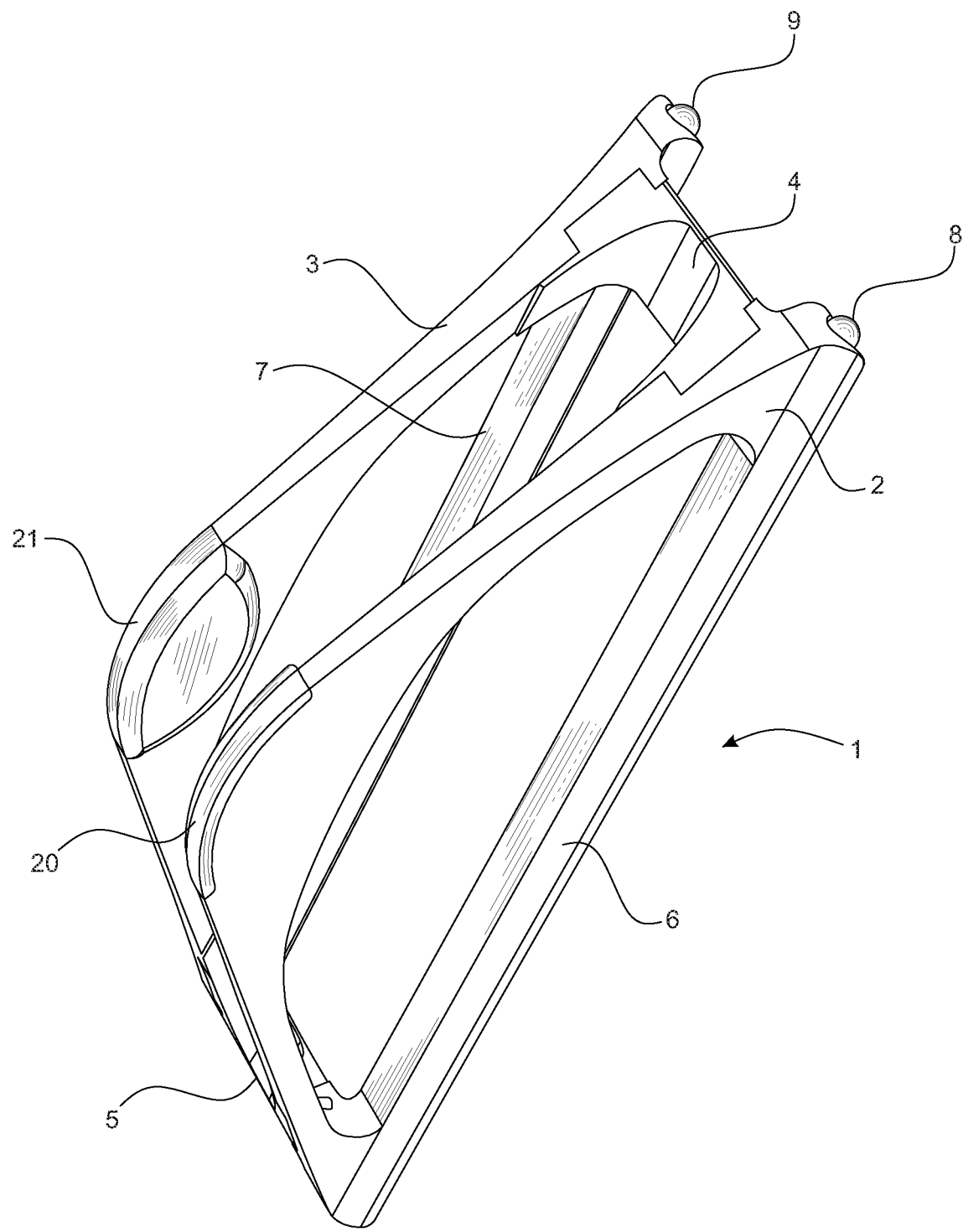
FIG. 1 shows a perspective view of the adjustable computer stand.

The computer stand of the invention uses a pair of supporting living hinges that are centrally located between opposing support arms. When the computer, e.g., a laptop or tablet, is rested across the living hinges, they flex downwardly from the weight and allow the opposing support arms to rotate towards each other and into contact with opposing surfaces of the supported computer.

The invention is conveniently described with reference to the attached figures. The same reference number will be used to designate the same structural feature in the figures.

As shown in the figures, computer stand 1 includes a first support arm 2 and second support arm 3 interconnected by living hinges 4, 5. It will be understood that one long living hinge may be used as well as two or more living hinges. Suitable materials used to make living hinges 4 include any of the polyalkylene, e.g., polyethylene or polypropylene, plastics that can withstand repeated flexure without embrittlement, cracking, or wear.

Support arms 2, 3 may, or may not, be formed integrally with base members 6, 7 that run the length of support arms 2, 3 from front to back of stand 1.

Support feet 8, 9 are secured in channels 10, 11 formed into the bottoms of base members 6, 7 and preferably exhibit a curved exterior surface so that the rotation of support arms 2, 3 towards each other permits support feet 8, 9 to remain in contact with an underlying desktop surface 12. Importantly, support arms 2, 3 are generally triangular and either parallel with each other or angled inwardly towards the other by an angle of 1-15°. Each of support arms 2, 3 extends vertically upwardly from corresponding base members 6, 7. The interconnection of support arms 2, 3 by living hinges 4, 5 are elevated above base members 6, 7 so that living hinges 4, 5 have the ability to flex and extend vertically downwardly as the weight of a laptop or tablet (not shown) is inserted between support arms 2, 3 onto central portion 13 of living hinges 4, 5 thereby causing support arms 2, 3 to rotate and engage opposing lateral sides of the inserted laptop.

Central portion 13 is flexible, such as by being relatively thin or made from a flexible material, having a thickness 14, such as 0.01-0.10 inches, and a width 15 that is suitable for receiving a laptop or tablet computer. Interlocking lateral surface features 16, such as a rectangular extension 17, undercut channel 18, or combination 19 of undercuts and overlocking profiles may be used to connect each hinge 4 to a support arm 2, 3. Alternatively, hinges 4, 5 and support arms 2, 3 may be connected by adhesive, welding, sonic welding, or other bonding techniques.

When weight is applied to central portion 13, central portion 13 is urged downwardly by the weight of the laptop and thereby causes the interlocking surface features 16 and their connected support arms 2, 3 to rotate inwardly. Gripping pads 20, 21 on support arms 2, 3 are thus rotated inwardly on either side of the inserted computer so that they press on the opposing surfaces of the inserted computer and thereby hold it with stability. Such stability permits one or more peripherals and accessories to be connected to the inserted computer with convenient access.

Figure 2:
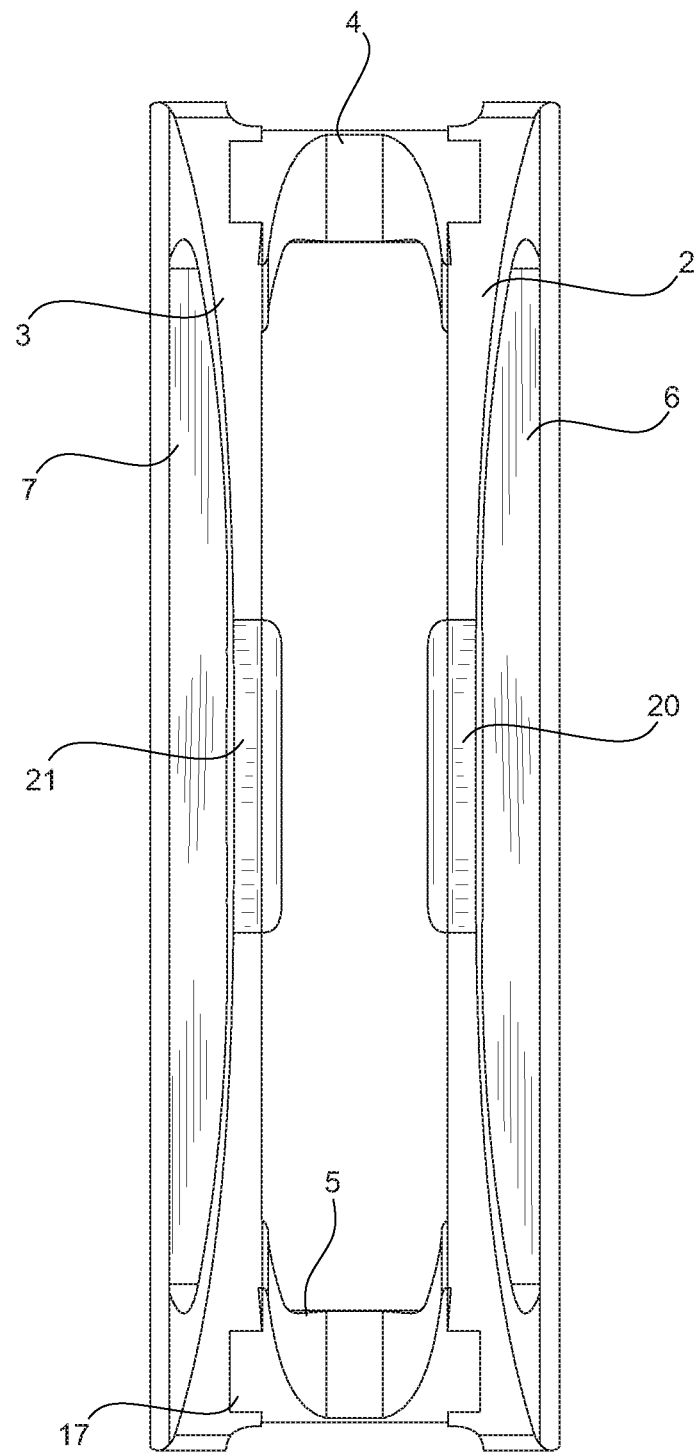
FIG. 2 is a top view of the adjustable computer stand.
Figure 3:
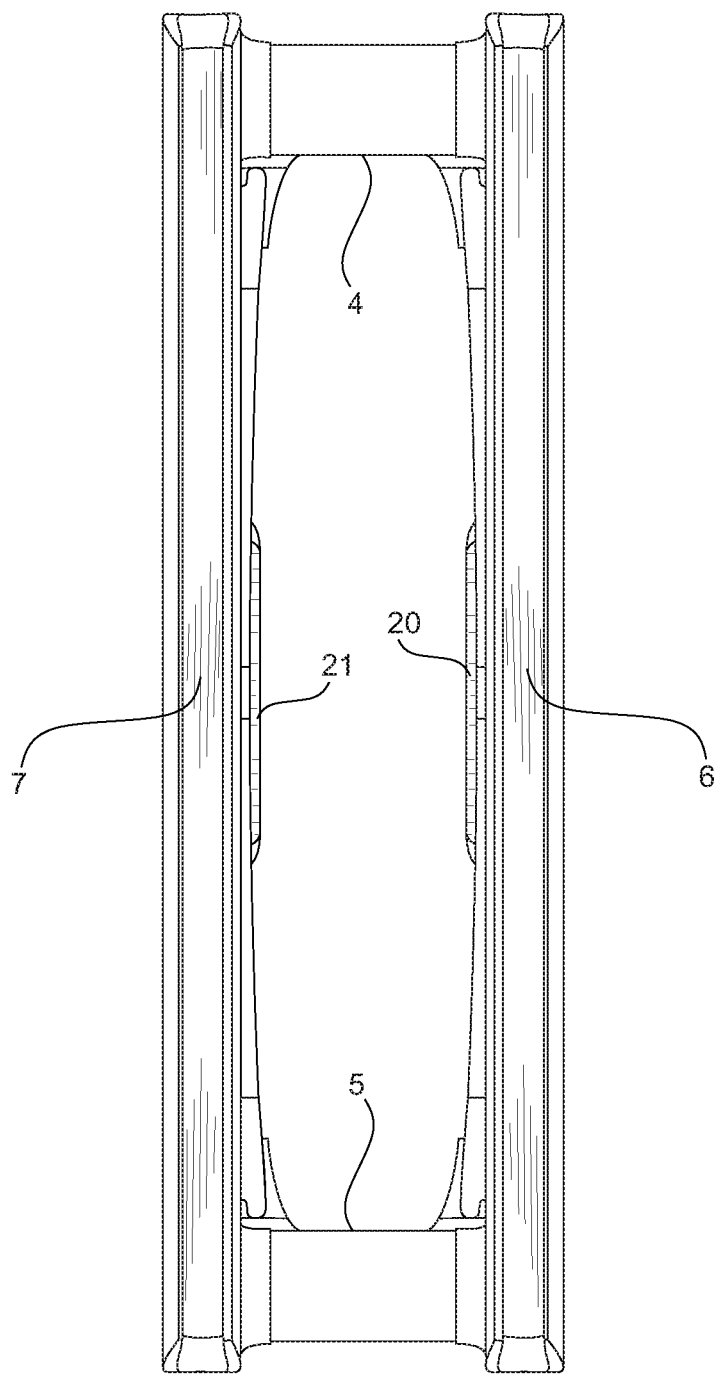
FIG. 3 is a bottom view of the adjustable computer stand.

FIGS. 2 and 3 show top and bottom views, respectively, of the stand and the extension of grip pads 20, 21 inwardly away from support arms 2,3.

Figure 4:
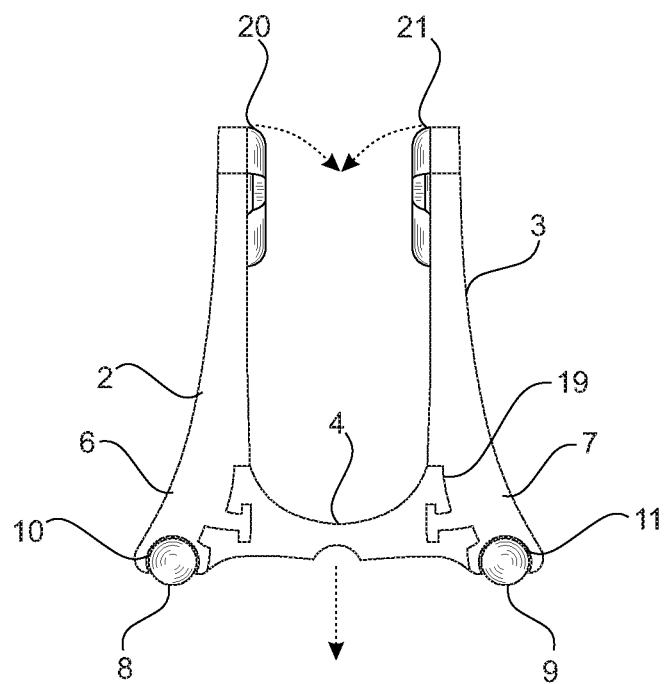
FIG. 4 is a front view of the adjustable computer stand.
Figure 5:
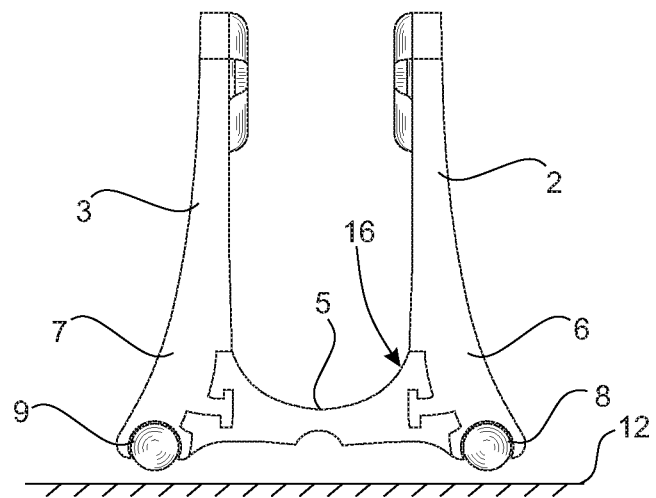
FIG. 5 is a back view of the adjustable computer stand.

FIGS. 4 and 5 illustrate the use of generally circular-shaped support feet 8, 9 that provide easy rotation of interconnecting living hinges 4, 5 between support arms 2, 3.

Figure 6:
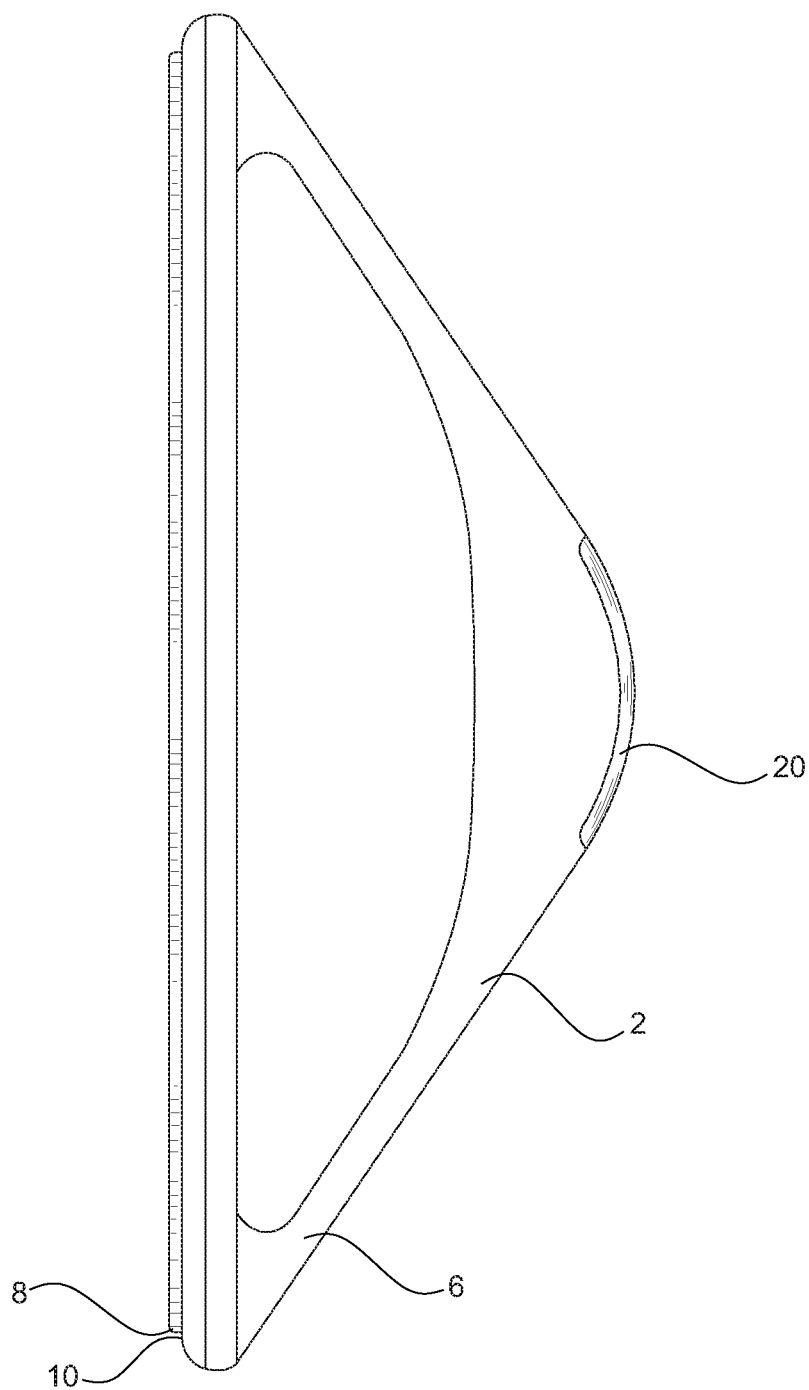
FIG. 6 is a view of the left side of the adjustable computer stand.
Figure 7:
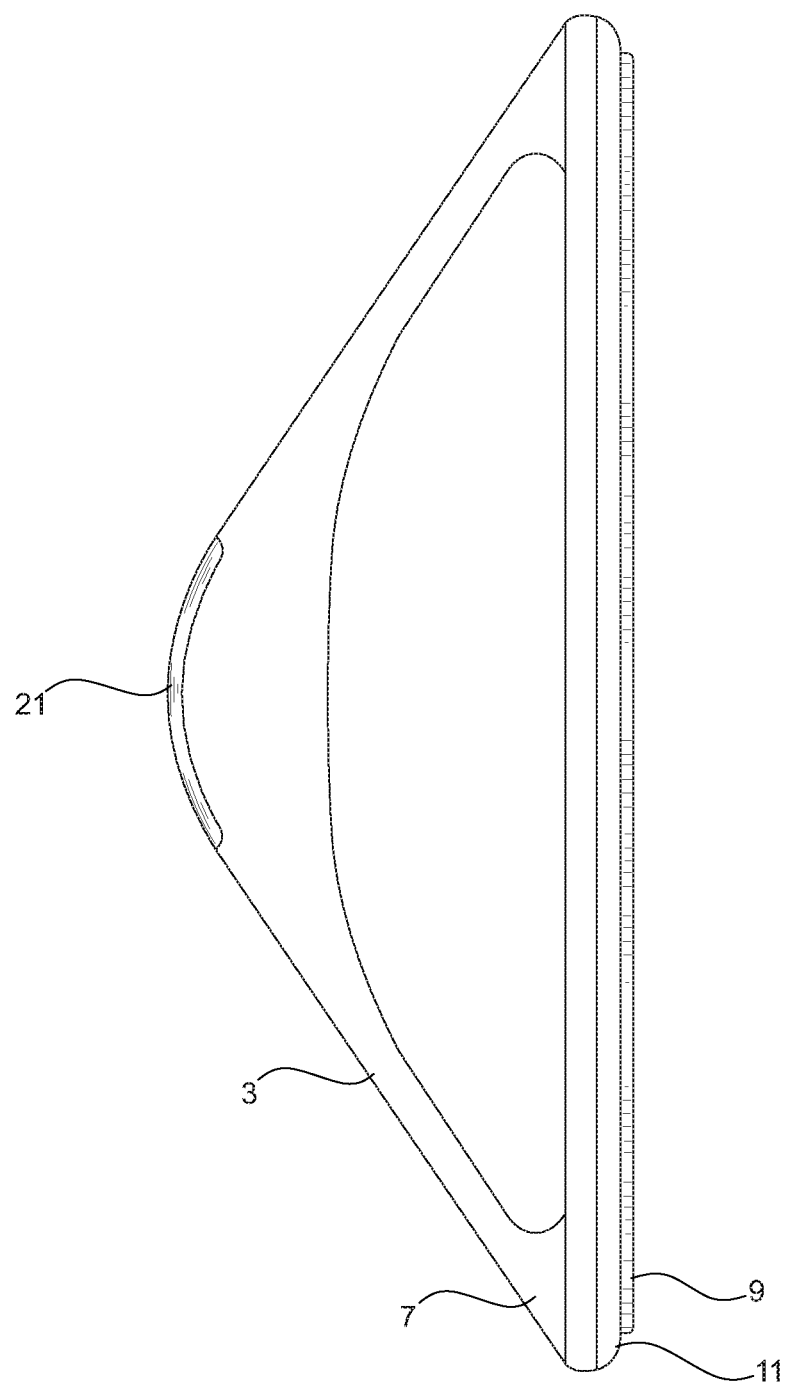
FIG. 7 is a view of the right side of the adjustable computer stand.

FIGS. 6 and 7 are side views that show the generally triangular shapes of support arms 2, 3. As shown, the central peak of each arm has a rounded shape defined by grip pads 20, 21 and an open central void that reduces the weight and material cost of the stand. If desired, the arms may be solid panels.

Figure 8:
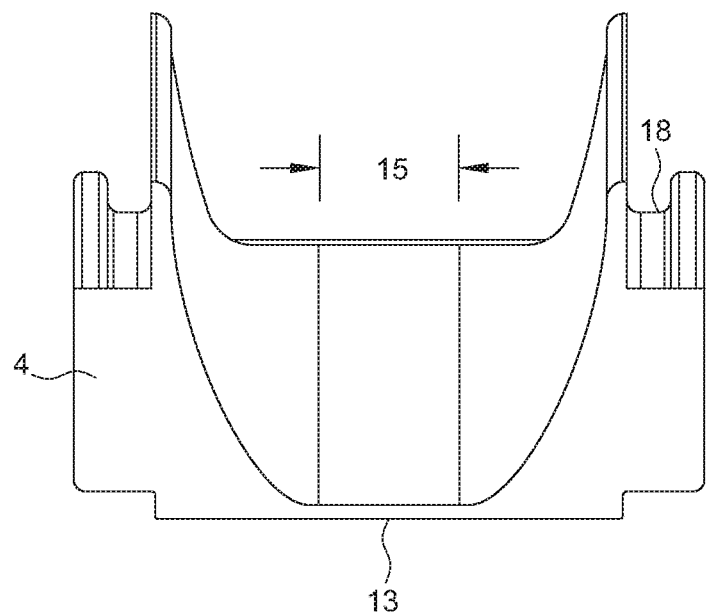
FIG. 8 is a perspective view of one of the living hinges.
Figure 9:
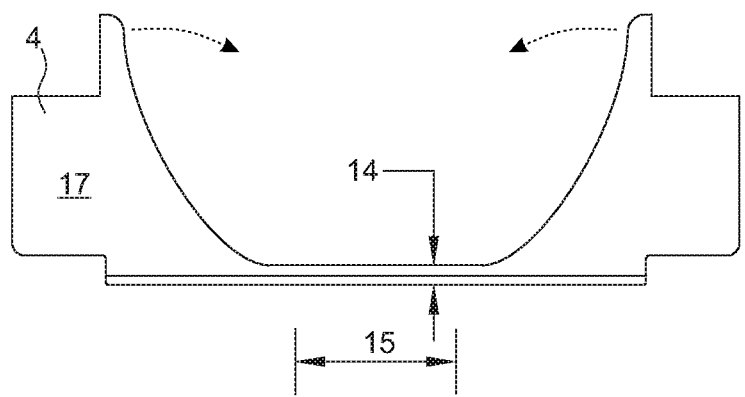
FIG. 9 is an end view of a living hinge support according to the invention.

FIGS. 8 and 9 show living hinge 4 in greater detail. In this view, the interlocking surface features 16 are exemplified by an undercut channel 18 with an end cap (FIG. 8) and a rectangular extension 17 (FIG. 9).

It is understood however that the description above is intended to describe preferred embodiments and is not intended to limit the scope of the appended claims.

The invention claimed is:

1. An automatically adjustable computer stand that comprises:
    a first support arm and a second support arm, each arm being connected to the other arm by at least one living hinge, said living hinge exhibiting a flexible central portion whereby weight from a computer pressing on the flexible central portions of each living hinge causes each support arm to rotate inwardly towards the other support arm and into contact with said computer.

2. A computer stand according to claim 1 wherein the first and second support arms are connected to the at least one living hinge by an interlocking surface feature on the at least one hinge, each support arm, or both the at least one hinge and each support arm.

3. A computer stand according to claim 1 wherein the first and second support arms are connected to the at least one living hinge by an adhesive connection to the at least one hinge, each support arm, or both the at least one hinge and each support arm.

4. A computer stand according to claim 1 wherein the first and second support arms are connected to the at least one living hinge by a welded connection to the at least one hinge, each support arm, or both the at least one hinge and each support arm.

5. A computer stand according to claim 1 wherein the first and second support arms are connected to the at least one living hinge by a combination of undercuts and overlocking profiles between the at least one hinge, each support arm, or both the at least one hinge and each support arm.

6. An automatically adjustable computer stand that comprises:
    a first support arm on a first support base member, said first support arm extending from a front of said stand to a back of said stand,
    a second support arm on a second support base member, said second support arm extending from a front of said stand to a rear of said stand,
    at least one living hinge having at least one flexible central portion interconnecting said first support arm and said second support arm elevated above the first and second base members so that weight from a vertically-oriented computer pressing down on the at least one flexible central portion causes each support arm to rotate inwardly towards the other and into contact with a respective side of said computer.

7. A computer stand according to claim 6 wherein said computer is a laptop computer or tablet computer and said at least one living hinge causes said arms to rotate inwardly in response to such weight.

8. A computer stand according to claim 6 wherein the first and second support arms each have a generally triangular shape.

9. A computer stand according to claim 6 wherein each of the first and second support arms further comprises a grip pad positioned to contact a side of an inserted computer after rotation of the support arms.

10. A computer stand according to claim 6 wherein a first living hinge connects the support arms at a front of said stand, and a second living hinge connects the support arms at a rear of said stand.

* * * * *